US012461859B2

(12) United States Patent
Jabreva et al.

(10) Patent No.: US 12,461,859 B2
(45) Date of Patent: Nov. 4, 2025

(54) INTERRUPTING MEMORY ACCESS DURING BACKGROUND OPERATIONS ON A MEMORY DEVICE

(71) Applicant: QUALCOMM Incorporated, San Diego, CA (US)

(72) Inventors: Sonali Jabreva, Firozabad (IN); Sridhar Anumala, Hyderabad (IN); Santhosh Reddy Akavaram, Hyderabad (IN); Prakhar Srivastava, Lucknow (IN); Manish Garg, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 32 days.

(21) Appl. No.: 18/347,359

(22) Filed: Jul. 5, 2023

(65) Prior Publication Data

US 2025/0013572 A1 Jan. 9, 2025

(51) Int. Cl.
*G06F 12/0855* (2016.01)
*G06F 12/02* (2006.01)

(52) U.S. Cl.
CPC ...... *G06F 12/0855* (2013.01); *G06F 12/0246* (2013.01); *G06F 2212/2022* (2013.01)

(58) Field of Classification Search
CPC ............. G06F 12/0855; G06F 12/0246; G06F 2212/2022
See application file for complete search history.

(56) References Cited

U.S. PATENT DOCUMENTS

| | | | |
|---|---|---|---|
| 9,690,518 B2 * | 6/2017 | Shinaar | G06F 3/0607 |
| 2012/0005404 A1 * | 1/2012 | Raz | G06F 12/0246 |
| | | | 711/E12.016 |
| 2015/0261452 A1 * | 9/2015 | Moon | G06F 3/0679 |
| | | | 711/103 |
| 2015/0378622 A1 * | 12/2015 | DeNeui | G06F 3/061 |
| | | | 711/114 |
| 2017/0068456 A1 * | 3/2017 | Toge | G06F 3/0679 |
| 2018/0314448 A1 * | 11/2018 | Grossman | G06F 3/064 |
| 2019/0013081 A1 * | 1/2019 | Blodgett | H04L 9/0861 |

(Continued)

OTHER PUBLICATIONS

International Search Report and Written Opinion—PCT/US2024/027747—ISA/EPO—Sep. 20, 2024.

*Primary Examiner* — Jason W Blust
(74) *Attorney, Agent, or Firm* — Loza & Loza, LLP

(57) ABSTRACT

Aspects relate to interrupting memory access during background operations of a memory device. In one example, a host for a memory device includes background operation circuitry configured to permit a background operation by a memory device. The host is coupled to the memory device through a bus. The host receives an operation completed notification from the memory device to indicate that the memory device has completed performing the background operation. Memory access command circuitry is configured to receive a memory access command. The memory access command concerns reading or writing data to the memory device coupled to the host. The memory access command circuitry initiates a wait at the host for the memory access command, and sends the memory access command to the memory device in response to receiving the operation completed notification.

27 Claims, 8 Drawing Sheets

(56) References Cited

U.S. PATENT DOCUMENTS

2021/0200700 A1* 7/2021 Tanpairoj ............... G06F 3/061
2022/0179587 A1   6/2022 Spector et al.
2022/0253242 A1* 8/2022 Cresci .................. G06F 3/0656

* cited by examiner

INTERRUPTING MEMORY ACCESS DURING BACKGROUND OPERATIONS ON A MEMORY DEVICE

TECHNICAL FIELD

Aspects of the present disclosure relate generally to memory access to a memory device through a memory bus and, in particular to interrupting memory access during background operations on the memory device.

BACKGROUND

Modern computing systems use significant memory resources. A memory may have many individual cells managed by a memory controller. Each cell is able to simultaneously store 1, 2, 3, 5, or another number of bits, depending on the physical structure of the cell. A memory controller manages read operations of data from the cells and write operations of external data into the cells. The memory controller also manages the use of the cells and may control logical address maps. Logical address maps are used to map logical data addresses to physical data addresses of particular cells.

The memory cells also require various background operations or memory management operations. Flash memory background operations include wear leveling, block erase operations, bad block management, wipe operations, garbage collection, etc. Many of the background operations prevent the affected memory cells from being accessed during the operation. Since flash memory must be erased as a block of memory cells before any data may be written to any cell in the block, erasing, also referred to as flashing, wiping, or purging, prevents access to an entire block of memory cells. Other types of memory require other background operations to be performed.

The host provides access to the memory to application layers executed by processors or controllers. The host connects to other parts of the computing system to allow operations to be performed on the data. In many configurations, the memory controller communicates with a host or other component through a memory bus. The memory bus allows data to be sent to and from the memory through the memory controller. The background operations may be driven by the memory controller, by the host, or by higher layer components of the computing system.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example a host for a memory device includes background operation circuitry configured to permit a background operation by a memory device. The host is coupled to the memory device through a bus. The host receives an operation completed notification from the memory device to indicate that the memory device has completed performing the background operation. Memory access command circuitry is configured to receive a memory access command. The memory access command concerns reading or writing data to the memory device coupled to the host. The memory access command circuitry initiates a wait at the host for the memory access command, and sends the memory access command to the memory device in response to receiving the operation completed notification.

In one example a method includes permitting, at a host, a background operation by a memory device, the host being coupled to the memory device through a bus for memory access. A memory access command is received at the host. The memory access command concerns reading or writing data to the memory device coupled to the host. A wait is initiated at the host for the memory access command. An operation completed notification is received from the memory device to indicate that the memory device has completed performing the background operation and the memory access command is sent to the memory device in response to receiving the operation completed notification.

In another example a non-transitory computer-readable medium has instructions stored therein for causing a processor of an interconnect link to perform the operations of the method above.

In another example, a method includes performing a background operation on memory cells of a memory device, sending an operation completed notification to a host coupled to the memory device in response to completing the background operation, receiving a write command from the host in response to the operation completed notification, and writing data of the write command to the memory cells of the memory device.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

When a host receives a memory access command from an application layer, e.g., to read or write data to a memory device, the host sends commands and data through the memory bus to the memory device. If the memory device is performing a background operation, e.g., a memory management operation, then the commands cannot be executed. Depending on the nature of the memory bus, the memory device may reply with a failure message or make no reply at all since the memory device is performing the background operation. If the host does not know whether the memory device is performing the background operation, then the host may repeat sending the commands and data. This requires activity by the host and the bus which consumes resources that may be better used for other activity. The host may instead abandon the command and rely on the application layer to repeat the command. This also consumes resources without any benefit.

In examples herein, the memory device sends an operation completed notification to the host after it has completed a background operation. Before receiving the operation completed notification, the host initiates a wait for any new memory access commands. After receiving the operation completed notification from the memory device, the host then empties its wait queue as commands to the memory device and sends any new memory access commands to its command queue. By waiting for the operation completed notification, the host does not risk that memory access commands will be ignored or discarded.

Figure 1:
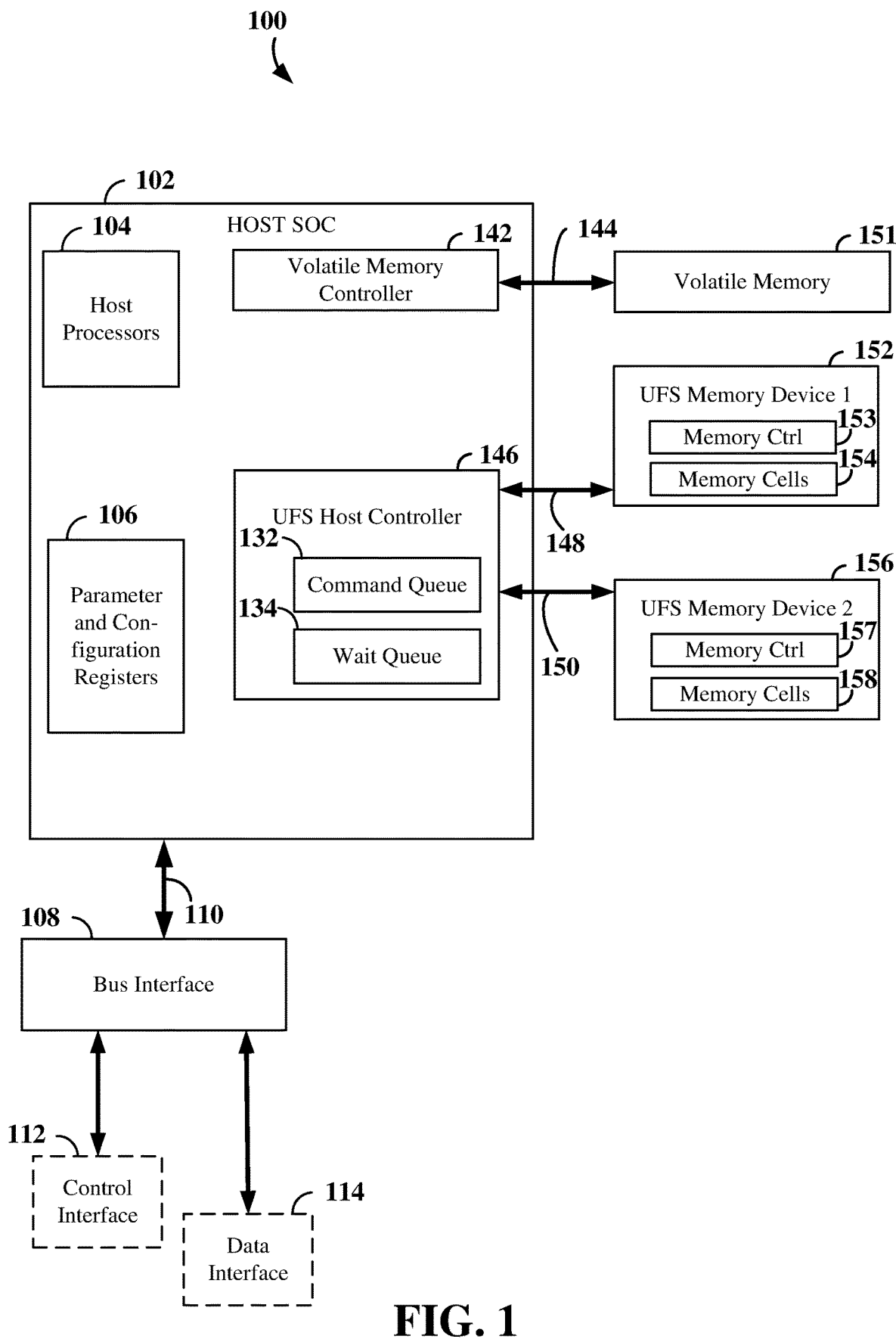
FIG. 1 is a diagram of an example computing system that includes a system-on-a chip (SOC) coupled to memory devices through UFS buses suitable for aspects of the present disclosure.

The present description is presented in the context of the JEDEC Standard Universal Flash Storage 4.0 (referred to as UFS herein), however, the principles herein may be applied to other memory device standards, operations, and data bus configurations. UFS describes protocols and communication formats for a memory bus that connects a host and a memory device. FIG. 1 is a diagram of an example computing system 100 that includes a system-on-a chip (SOC) coupled to memory devices through UFS buses. The host SOC 102 includes one or more host processors 104 for performing the primary operations of the die and parameter and configuration registers 106. The host SOC 102 may be configured for use as any desired computing device from an embedded processor to a portable communications device to a desktop workstation to a server.

In accordance with various aspects of the disclosure, an element, or any portion of an element, or any combination of elements may be implemented with the host SOC 102. Examples of the processor include a central processor, a graphics processor, a special purpose processor, a memory controller, and an input/output controller. Examples of a UFS host controller 146 include microprocessors, microcontrollers, digital signal processors (DSPs), field programmable gate arrays (FPGAs), programmable logic devices (PLDs), state machines, gated logic, discrete hardware circuits, and other suitable hardware configured to control the memory bus connection to the first and second memory devices. In various examples, the host SOC 102 may be configured to perform any one or more of the functions described herein. The host SOC 102 contains other components (not shown) configured to perform other functions of the module as is suitable for the type of die.

The host SOC 102 may be implemented with a bus architecture that may include any number of interconnecting buses and bridges depending on the specific application of the host SOC 102. A bus architecture may be used to communicatively couple together various circuits including processors, controllers, timing sources, peripherals, data buffers, modules, power management circuits, and other processing cores, which are not described any further. A bus interface 108 provides an interface between an external bus 110 and other optional external interfaces e.g., a control interface 112 and a data interface 114, etc. The processors 104 may communicate operations, administration, or management control with the control interface.

The control interface 112 may be used to provide a communication interface or means of communicating with various other apparatuses and devices (for example, other devices housed within the same package or system) over an internal bus or external transmission medium, such as command and control interfaces for power regulation, power-on test, and other purposes. The data interface 114 may be used to provide data connections to other types of components within the package or system. The control interface 112 and the data interface 114 may be connected to a higher layer and to lower-level peripherals, sensors, and other components. There may be multiple different control interfaces and data interfaces coupled to the same bus 110 or an additional bus.

The host processors 104 are coupled to a volatile memory controller 142 to interface with a volatile memory 151 such as a random-access memory (RAM) through a RAM bus 144. The host processors 104 are coupled to a UFS host controller 146 to interface with a first UFS memory device 152 through a first bus 148 and to a second UFS memory device 156 through a second bus 150. There may be more or fewer memory devices and each device may couple through a host controller or a shared host controller, as shown. The UFS host controller receives commands from the host processors 104, buffers the commands in a command queue 132 of the UFS host controller 146 and then, when ready, sends the command to the first UFS memory device 152 or the second UFS memory device 156, as appropriate for the command, through the respective bus 148, 150.

A variety of different commands may be received from the host processors 104. Common memory access commands are to write to one or more registers and to read from one or more registers. An erase command may be treated in a flash memory as an un-map command in which the corresponding physical addresses are indicated in a memory map as not being mapped. During a background operation, the corresponding memory cells will be purged or flashed for re-use.

Replies from the respective memory device are returned on the respective bus and sent to the host processors 104 or other component as appropriate for the command. While only one command queue 132 is shown, there may be multiple queues for each memory device. A wait queue 134 of the UFS host controller is used for commands that are in a wait at the UFS host controller 146.

The first UFS memory device 152 includes a memory controller 153 and memory cells 154 for storing data. The memory controller 153 maps logical memory addresses to physical memory addresses in the memory cells 154 and performs background operations to maintain and optimize the operation of the memory cells 154. The memory controller 153 also serves as an interface through the UFS bus 148 to the UFS host controller 146. The memory controller 153 may include an interface layer (not shown) as an interface to the UFS bus 148. The interface layer may include a logic layer and a physical layer to the UFS bus. The interface layer may be integrated into the memory controller 153 as shown or configured as a separate component. Similarly, the UFS host controller 146 may also include an interface layer (not shown) with a logic layer and a physical layer to the UFS bus. The second memory device 156 also includes a memory controller 157 and memory cells 158.

The UFS bus 148, 150 has multiple upstream and downstream lanes that operate on differential signaling. There are also reset and clock lanes to support the differential lanes. The transport protocol supports packets and frames with commands based on Small Computer System Interface (SCSI). However, UFS is provided only as an example, and the aspects presented herein may be applied to variations on UFS and other memory systems.

The host controller 146 may have additional buffers, controllers, and other components, including read buffers, write buffers, status registers, physical interface state machines and other components, not shown herein. Similarly, the memory device 152, 156 may also have buffers, controllers, status and control registers, and other components not shown herein.

The memory controller 153 or 157 may be configured to operate a variety of different background operations independently of the host (shown as the host controller above). The memory device 152 or 156, using its memory controller 153 or 157, may be configured to signal to the host 102 a need to execute a particular background operation. After the background operation, an operation completed notification may be in the form of an interrupt on the memory bus 148 or 150. The interrupt may use a wExceptionEventStatus attribute on a Universal Flash Storage memory bus. The signal to the host 102 allows the host 102 to find a suitable time for the background operation. As an example, the host 102 may check that the command queue 132 is empty or continue to process commands to the memory device 152 or 156 until the command queue 132 is empty. The host 102 responds to the request by setting a background operation enable flag. This is sent to the memory device 152 or 156 which then starts the background process.

A background operation needed request from the memory controller may take different forms that indicate the performance or the operation as being impacted or critical. In one example a first level is 2 h: Operations outstanding (performance being impacted), and a second level is 3 h: Operations outstanding (critical). In a later response from the memory controller, 3 h indicates that the background operation is completed successfully and 05 h indicates that the background operation has failed. In some examples, the purge operation has a unique purge operation needed request from the memory device and purge enable flag set by the host. The purge operation is an operation that is performed on physical blocks of memory cells that are not being used to store logical block data. These are blocks of memory cells that were used to store data that has been moved or erased through the logical address map. The purge operation removes all the data from the entire physical block. Dynamic device capacity is an operation that allows the capacity of the memory device to be reset in particular after a purge or other re-mapping.

When the memory device is performing a background operation, especially a critical background operation, e.g., purge and dynamic device capacity, it cannot also perform some host commands, especially with respect to the blocks of memory cells that are affected by the background operation. In some examples, when the host issues any command to the memory device, the memory device on receiving this command discards the host command. The memory device may also respond back to the host through the bus with a general failure. The host can avoid this result by first polling the memory device through the bus to determine if the memory device is running a background operation. The host can then issue the command again later after the background operation is ended. The host must continue to poll until the background operation is ended. However, with an operation completed notification, the host does not need to poll again, if at all.

While the host sets the background operation enable flag, the host does not start the background operation or run the background operation. The memory device runs the background operation independent of the host. At the same time, the host receives commands from application layers, such as from the host processors independent of how the memory device is running any background operation. The host may therefore issue commands to the memory device independent of any background operation status.

In UFS, the application layer of UFS includes a UFS command set (UCS), a device manager and a task manager. The UCS will handle the normal commands like read, write, etc. UFS may support multiple command sets. UFS is designed to be protocol agnostic. The command set is based on a simplified SCSI command set. The UCS also has a UFS native command set that may be used to extend some UFS functionalities. The task manager, run by the UFS host controller handles commands meant for command queue control. The device manager run by the memory controller provides device level control like query request and lower-level link-layer control.

Figure 2:
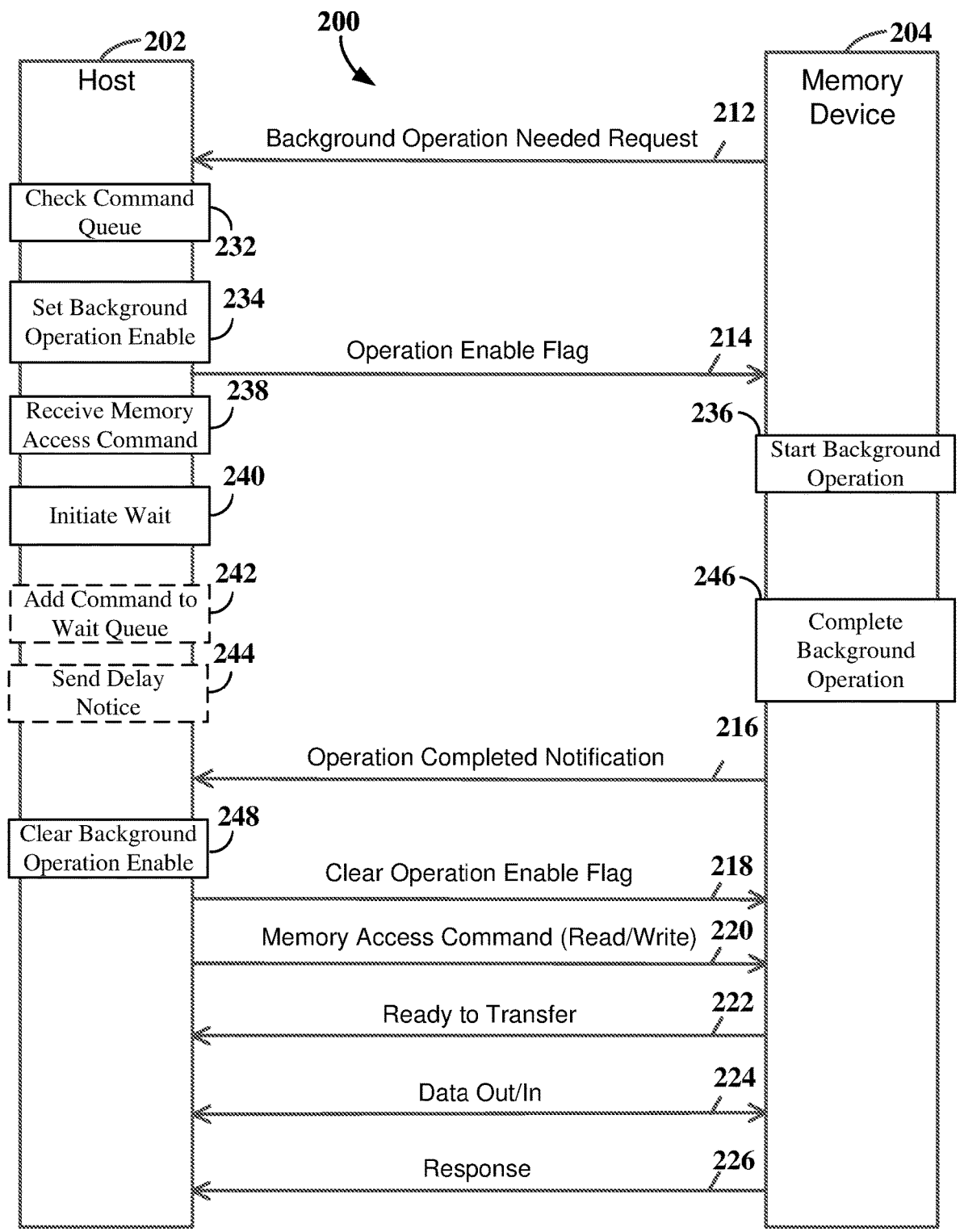
FIG. 2 is a diagram of signals and operations performed by a host and a memory device suitable for aspects of the present disclosure.

FIG. 2 is a diagram of signals and operations performed by a host and a memory device. The host 202 is coupled to the memory device 204 by a bus 200 represented by the signals between the host 202 and the memory device 204. The host 202 and the memory device 204 have performed startup, configuration, handshake, and other operations, not described herein, and configured for memory access using the bus 200.

In some aspects, after some time of operation, the memory device, through its memory controller, determines that a background operation, e.g., a purge, a dynamic device capacity, a memory un-mapping, or another background operation is needed to maintain the memory cells. Accordingly, it sends a background operation needed request 212 to the host 202. For UFS, this request may be in the form of a Response UFS Protocol Information Unit (UPIU) that includes an indication of importance such as 2 h or 3 h. The host receives the request and processes the request to determine whether the request should be allowed. There are different considerations, depending on the nature of the memory device and any bus protocols. In some examples, the host checks its command queue 232. If there are important or urgent commands in the command queue, then the host waits until these commands have been processed by the memory device. After the command queue is empty or the important commands have been processed, and after any other selected considerations, the host sets a background operation enable flag 234. The host may also send a notification 214 to the memory device. For UFS this may be in the form of a Request UPIU.

The memory device 204 detects the background operation enable flag and, after suitable preparation, the memory device 204 starts the background operation 236. The memory device continues with the background operation until the background operation is completed 246, after which it sends an operation completed notification 216 to the host 202. For UFS, this notification may be in the form of a Response UPIU that includes a flag and a report that the operation was good or failed. The operation completed notification 216 from the memory device 204 allows the host to clear the background operation enable flag 248. The operation completed notification 216 may be sent because the operation is finished, the operation has reached an intermediate, stable state, the operation has failed and been aborted or for other reasons.

With the background operation enable flag 248 cleared, the host 202 sends a Request UPIU as a clear operation enable flag notification 218 to the memory device. The host may also resume normal operation and send memory access commands 220, e.g., Command UPIU, to the memory device 204. The memory access commands may be read, write, erase, or any other suitable type of operation to access the memory to add or read values. The memory device may respond with a ready to transfer (RTT) message 222, e.g., an RTT UPIU, from the memory device 204 to the host 202. The host may then transfer the data 224 either to the memory device 204 to be written to the memory cells, e.g., Data In UPIU, or from the memory device 204 to be sent to the host processors or another component of the host, e.g., Data Out UPIU. Upon completion of the transfer, the memory device 204 may send a response 226 to the host 202 indicating the end of the memory access command. This process may then be followed by further memory access commands. The particular order and structure of a memory access may be modified to suit different implementations and protocols.

Even though, the background operation enable flag 234 is set, new commands may be received by the host from higher layers of the system, such as application layers and the host processors. A memory access command is received at 238 but the host knows that the background operation is likely started. As a result, the host will initiate a wait 240. The host may add the command to a wait queue 242. The host may also notify the source of a memory access command that the memory access command will be delayed, e.g., by sending a delay notice 244. The source of the command may then abort the command or retry the command at a different time, or find another resource to service the memory access command. In some examples, the application layer will send the memory access command to the host a second time after a delay. When the delay is longer than the time to complete the background operation, then the memory access command will be acted upon after it is sent the second time.

If the memory device 204 is undergoing a background operation and in particular a critical operation and the host 202 needs to issue a command to the device, the host initiates a wait 240. The host does not issue the command but saves the command in a wait queue at the host. The host may continue storing commands in the wait queue until the memory device completes its ongoing operation as indicated by the operation completed notification 216.

The operation completed notification 216 may take many different forms. In one example, the memory device generates an interrupt using the UFS wExceptionEventStatus attribute and sends the interrupt to the host once the background operation is completed. After receiving this alert, the host can issue commands from the wait queue to the memory device and the wExceptionEventStatus attribute may be modified, for example at the [7] bit to form the operation completed notification 216. Any other message or attribute may be used. There may be different forms of the operation completed notification 216 for different operations or to convey a status that is different from completion.

Figure 3:
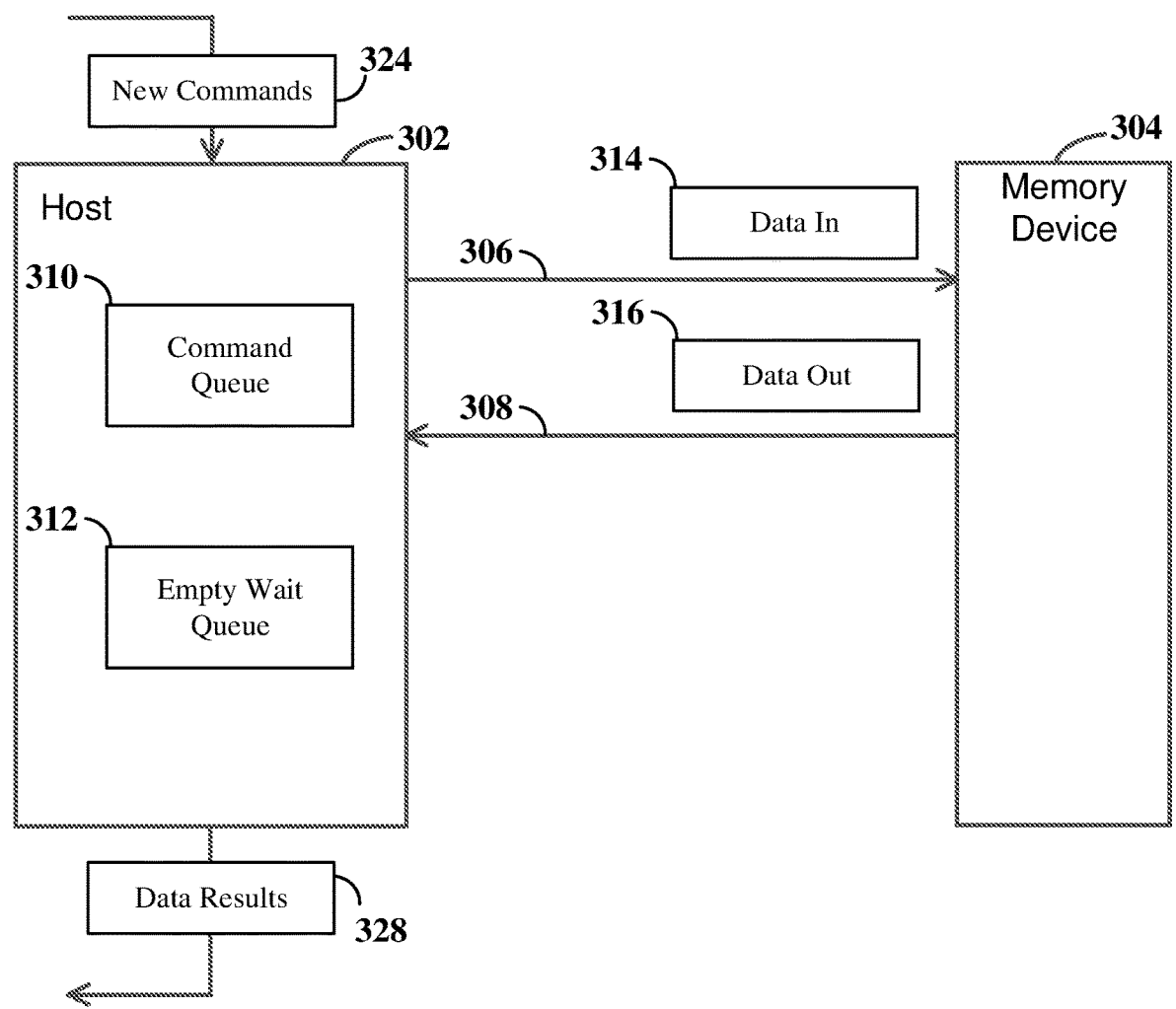
FIG. 3 is a graphical representation of status and communication of a host and a memory device during normal memory access commands according to aspects of the present disclosure.

FIG. 3 is a graphical representation of status and communication of a host 302 and a memory device 304 during normal memory access commands. A host 302 is coupled to a memory device 304 with a downstream lane 306 and an upstream lane 308. For normal memory access commands, the host receives new memory access commands 324 and stores these commands into a command queue 310. The command queue may be in various levels of capacity, depending on how quickly the commands are received and how quickly they are run by the memory device. The host 302 has an empty wait queue 312 that has no commands or data. The host sends data and commands as data in 314 on the downstream lane 306 and receives data and responses as data out 316 on the upstream lane 308. The results from the data out 316 are reported back as data results to higher layers, e.g., host processors.

Figure 4:
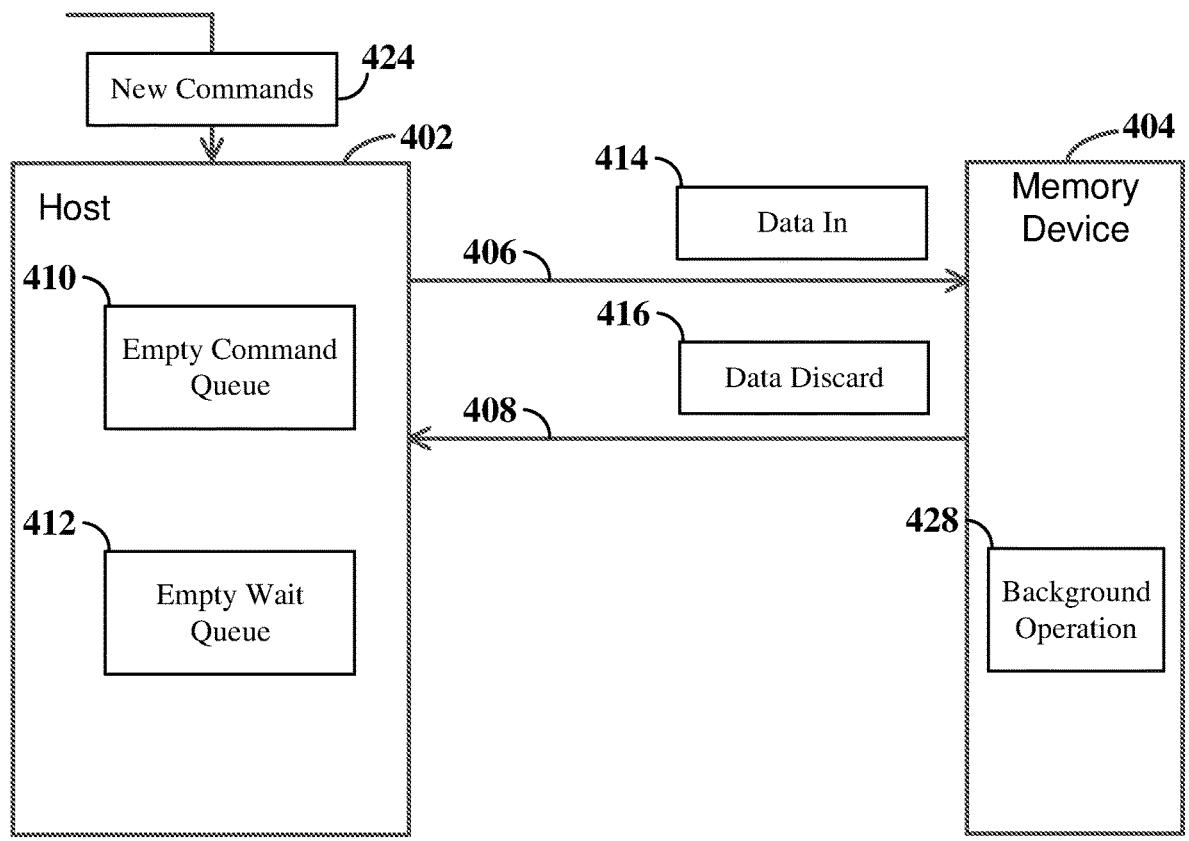
FIG. 4 is a status and communication of a host and a memory device during normal background operations according to aspects of the present disclosure.

FIG. 4 is a graphical representation of status and communication of a host 402 and a memory device 404 during normal background operation. When a background operation 428 is in progress at the memory device 404, then any new commands 424, data in 414, or other requests will be replied with a data discard 416. The host 402 has an empty command queue 410 before the background operation 428 is started and during the background operation. If any new commands 424 come into the empty command queue 410 and are sent to the memory device 404, then the memory device 404 will discard the data with data discard 416 because the memory device is busy with the internal process of the background operation 428. The data discard 416 may be in the form of a Response UPIU to the host. The empty wait queue 412 is not used for this configuration.

Figure 5:
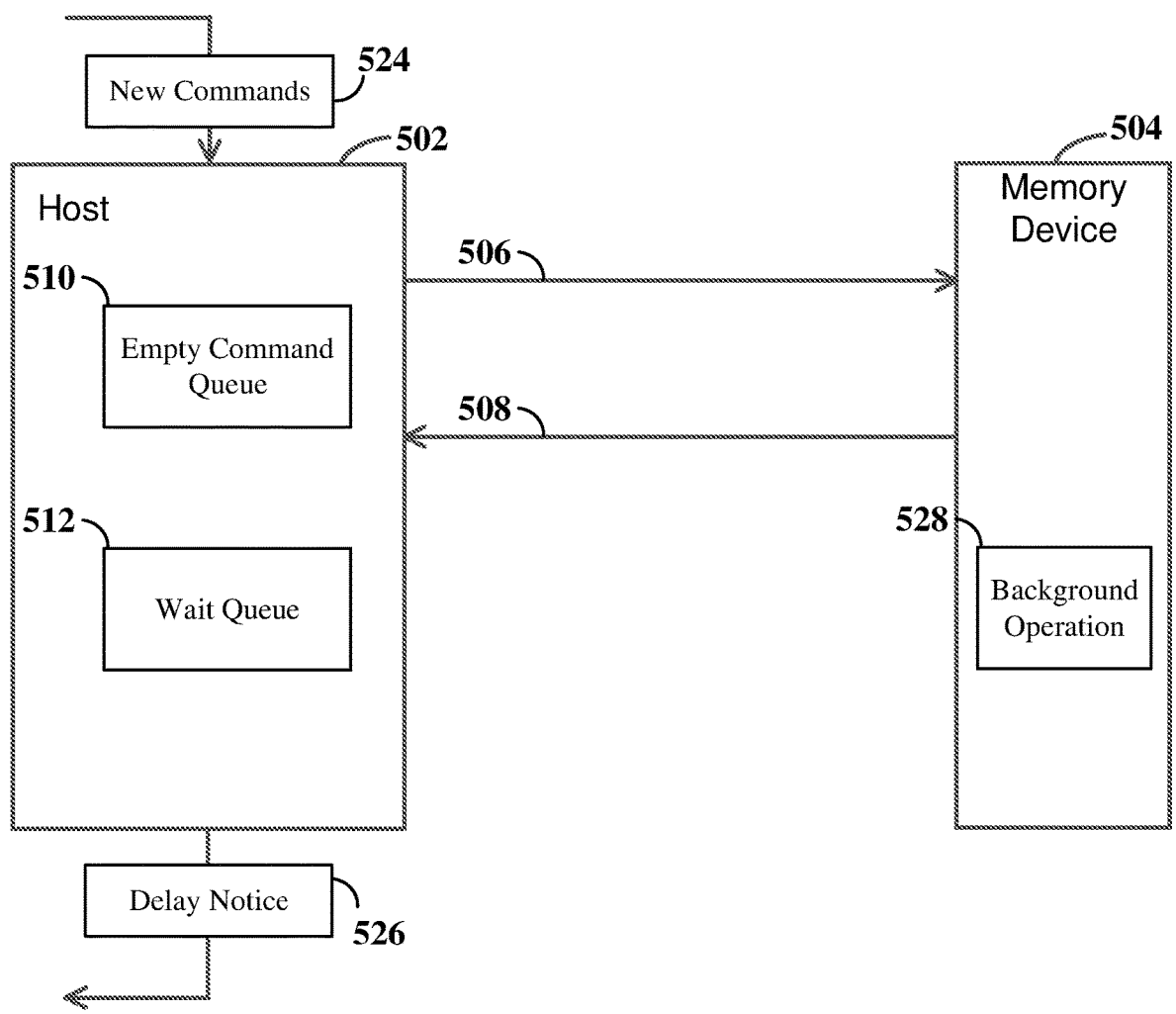
FIG. 5 is a graphical representation of status and communication of a host and memory device during a background operation when a wait queue is available according to aspects of the present disclosure.

FIG. 5 is a graphical representation of status and communication of a host 502 and memory device 504 during a background operation when a wait queue 512 is available. As the background operation 528 continues, new commands 524 are moved to the wait queue 512. The formerly empty wait queue may become an occupied wait queue with incoming new commands 524. The host 502 may save all the incoming new commands 524 in the wait queue 512 until the background operation 528 is completed.

The higher layer may also receive a delay notice 526 for any new commands 524. With the delay notice 526, the higher layer may be allowed to choose to wait for the background operation 528 to be completed or to send the new commands 524 to the wait queue 512 to be handled as soon as the background operation 528 is completed. The memory device 504 continues to complete the background operation 528 without receiving any new data in. Using the wait queue 512, the host 502 is able to receive new commands 524 but not send them to the memory device 504. This avoids the data discard 416 of FIG. 4.

Figure 6:
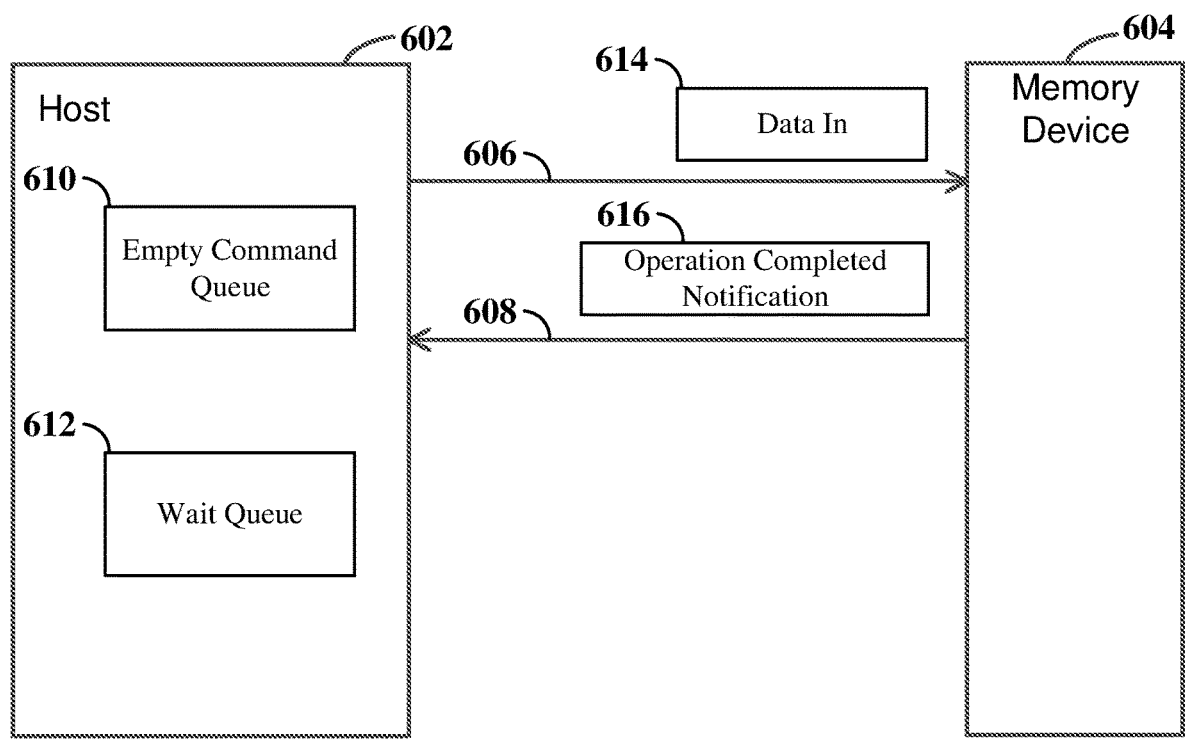
FIG. 6 is a graphical representation of status and communication of a host and memory device after the completion of the background operation according to aspects of the present disclosure.

FIG. 6 is a graphical representation of status and communication of a host 602 and memory device 604 after the completion of the background operation 528 of FIG. 5. After the background operation 528 is completed, the memory device 504 sends an operation completed notification 606 to the host 602. This may be in the form of an interrupt or response. The host 602 still has an empty command queue 610 until new commands are received from higher layers. The wait queue 612 may be completely or partially filled and so the host takes commands from the wait queue and sends them to the memory device 604 as data in 614. These will be received and processed by the memory device 604 to generate new data out. The host 602 takes the data out and forwards it to the higher layers. When the host 602 empties the wait queue 612, the host 602 returns to normal operation as shown with respect to FIG. 3. Any new commands are placed in the command queue 310 and sent as data in 314. The wait queue is then an empty wait queue 312.

Figure 7:
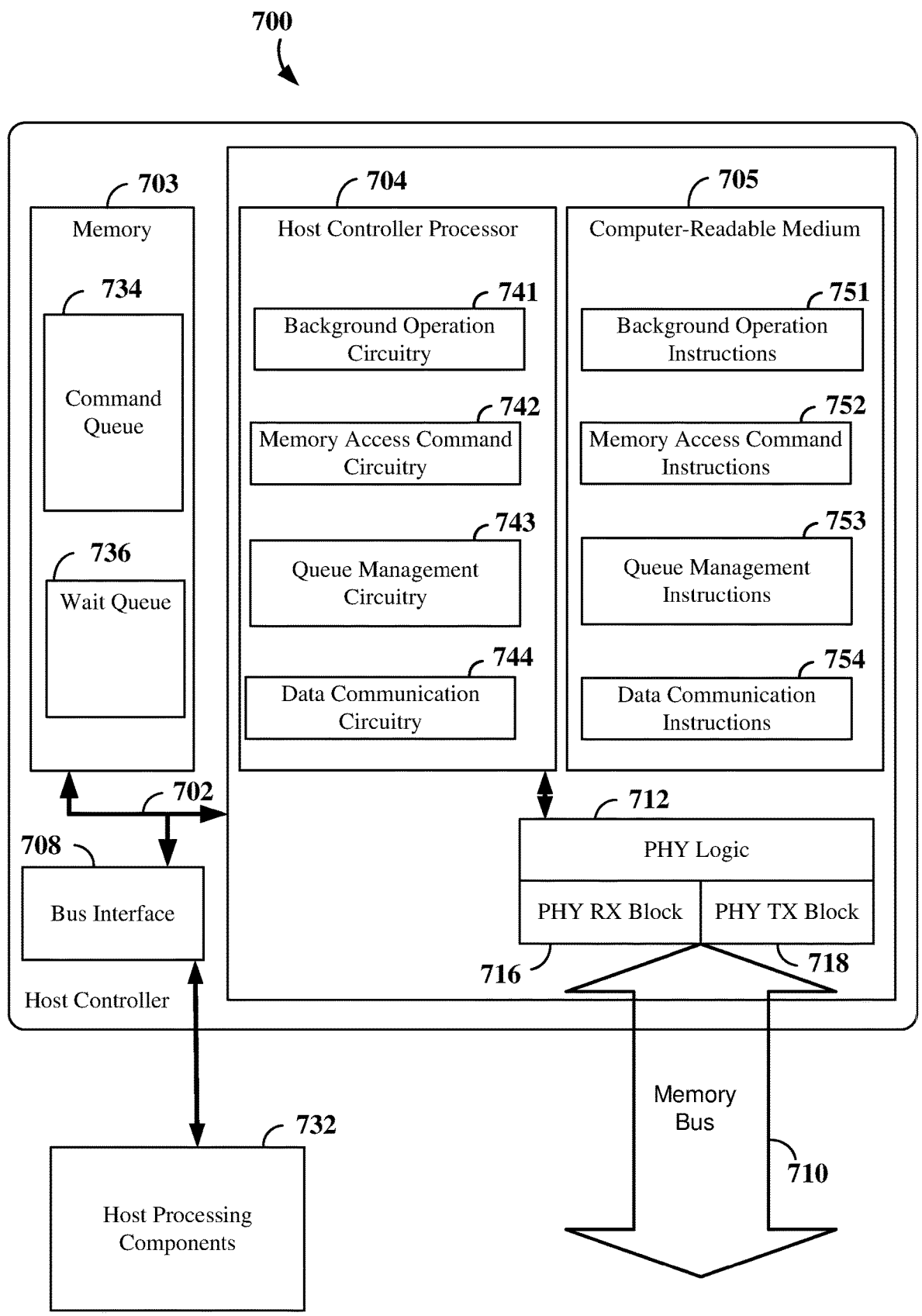
FIG. 7 is a block diagram of a host controller according to aspects of the present disclosure.

FIG. 7 is a block diagram of an example of a hardware implementation for a host controller 700 e.g., a central processor, a special purpose processor, an input/output controller, or any other suitable components with a memory bus connection having a memory access and background operations. In this example, the host controller has a host controller processor 704 for performing the primary operations of the host controller, a computer-readable medium 705 to provide instructions for the host controller processor 704, and a memory 703 to contain a command queue 734 and a wait queue 736 for memory access commands and other data and instructions. The host controller has an interface to support a memory bus 710 to a memory device. The interface has a PHY receive block 716 and a PHY transmit block 718 coupled to the memory bus and PHY logic 712. The host controller processor 704 performs the operations described above to service the memory bus 710 between host processing components 732 and a memory device (not shown).

Examples of the host controller 700 include microprocessors, microcontrollers, digital signal processors (DSPs), field programmable gate arrays (FPGAs), programmable logic devices (PLDs), state machines, gated logic, discrete hardware circuits, and other suitable hardware configured to control the memory bus 710 as described throughout this disclosure. In various examples, the host controller 700 may be configured to perform any one or more of the functions described herein. The host controller contains other components (not shown) configured to perform other functions of the host controller as is suitable for the type of memory bus.

In this example, the host controller 700 may be implemented with a bus architecture, represented generally by the bus 702. The bus 702 may include any number of interconnecting buses and bridges depending on the specific application of the host controller 700 and the overall design constraints. The bus 702 communicatively couples together various circuits including memory 703, the host controller processor 704, and the computer-readable media (represented generally by the computer-readable medium 705) having instructions stored thereon. The bus 702 may also link various other circuits such as timing sources, peripherals, data buffers, modules, power management circuits, and other processing cores, which are not described any further. A bus interface 708 provides an interface between the bus 702 and host processing components 732, e.g., other external components of a Host SOC, host processing components, application layers, and higher layers. The host controller processor 704 may communicate operations, administration, or management control with the host processing components 732 through the bus 702. The host processing components 732 may send memory access commands to the host controller processor 704 and receive results from the host controller processor.

The PHY transmit block 716 and the PHY receive block 718 are coupled to the memory bus 710 that corresponds to the upstream lane and the downstream lane described above that couple host processing components 732 to the memory device (not shown) through pins on respective connectors for the memory bus 710. The module also includes PHY logic 712 which may include the link logic to control the data applied to each line and the state under the control of the host controller processor 704. The PHY logic 712 may also include clock generators coupled to clock sources to generate clock signals and other reference signals for the upstream and downstream lanes.

The host controller processor 704 is responsible for managing the PHY logic 712 and for interface processing, including the execution of software stored on the computer-readable medium 705. The software, when executed by the host controller processor 704, causes the host controller 700 to perform the various functions described below for any particular apparatus. The computer-readable medium 705 and the memory 703 may also be used for storing data that is manipulated by the host controller processor 704 when executing software.

The host controller processor 704 may perform operations by means of a processor core executing software stored in the computer-readable medium 705. Software shall be construed broadly to mean instructions, instruction sets, code, code segments, program code, programs, subprograms, software dies, applications, software applications, software packages, routines, subroutines, objects, executables, threads of execution, procedures, functions, etc., whether referred to as software, firmware, middleware, microcode, hardware description language, or otherwise. The software may reside on a computer-readable medium 705. The host controller processor 704 controls the operations performed by the PHY logic 712, the command queue 734, the wait queue 736, and other components of the host controller 700.

The computer-readable medium 705 may be a non-transitory computer-readable medium. A non-transitory computer-readable medium includes, by way of example, a magnetic storage device, a flash memory device, a random access memory (RAM), a read only memory (ROM), a programmable ROM (PROM), an erasable PROM (EPROM), an electrically erasable PROM (EEPROM), a register, and any other suitable medium for storing software and/or instructions that may be accessed and read by a controller. The computer-readable medium 705 may reside in the host controller processor 704 or another part of the host controller 700. The computer-readable medium 705 may be embodied in a firmware for the operation of a state machine or parameters of an ASIC. Those skilled in the art will recognize how best to implement the described functionality presented throughout this disclosure depending on the particular application and the overall design constraints imposed on the overall system.

The host controller 700 may be configured to perform any one or more of the operations described herein. In some aspects of the disclosure, the host controller processor 704, as utilized in the host controller 700, may include circuitry configured for various functions. The host controller processor 704 is coupled to the computer-readable medium 705 through the bus 702. The computer-readable medium 705 includes parameter and configuration registers that may include parameters for response, requests, flags, and operations.

The host controller processor 704 may include background operation circuitry 741 to permit a background operation by the memory device and to receive an operation completed notification from the memory device. The background operation circuitry 741 may also be configured to send requests and receive responses with a memory device to receive a background request needed request, including a purge operation needed request with different levels of urgency and set and clear background operation enable flags. The background operation circuitry 741 may include one or more hardware components that provide the physical structure that performs various processes related to permitting a background operation and receiving an operation completed notification with the memory device to support background operations. The background operation circuitry 741 may include functionality for a means for permitting a background operation and a means for receiving a background operation completed notification from the memory device. The background operation circuitry 741 may further be configured to execute background operation instructions 751 included on the computer-readable medium 705 to implement the background operation support described herein.

The host controller processor 704 may include memory access command circuitry 742 configured to receive a memory access command, to initiate a wait at the host for the memory access command, and to send the memory access command to the memory device in response to receiving the operation completed notification. The memory access command circuitry 742 may include functionality for a means to receive a memory access command, to initiate a wait at the host for the memory access command, and to send the memory access command to the memory device in response to receiving the operation completed notification. A memory access command may be received from a higher layer, e.g., host processing components 732. The memory access command circuitry 742 may further be configured to execute memory access command instructions 752 included on the computer-readable medium 705 to implement one or more functions described herein.

The module 714 host controller processor 704 may include queue management circuitry 743 configured to buffer commands in the command queue and the wait queue and to determine the status of the command queue as discussed herein. The queue management circuitry 743 may include functionality for buffering commands in the command queue and the wait queue and determining the status of the command queue. The queue management circuitry 743 may include functionality for a means for buffering commands in the command queue and the wait queue and determining the status of the command queue. The queue management circuitry 743 may further be configured to execute queue management instructions 753 included on the computer-readable medium 705 to implement one or more functions described herein.

The host controller processor 704 may include data communication circuitry 744 configured to communicate commands and data with the memory device through the memory bus 710, as discussed herein. The data communication circuitry 744 may include functionality for a means for communicating data with the memory device. The data communication circuitry 744 may further set parameters for communicating through the memory bus. The data communication circuitry 744 may further be configured to execute data communication instructions 754 included on the computer-readable medium 705 to implement one or more functions described herein.

The circuit architecture described herein may be implemented on one or more ICs, chips, chiplets, modules, interposers, packages, system printed circuit boards (PCBs), etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

Figure 8:
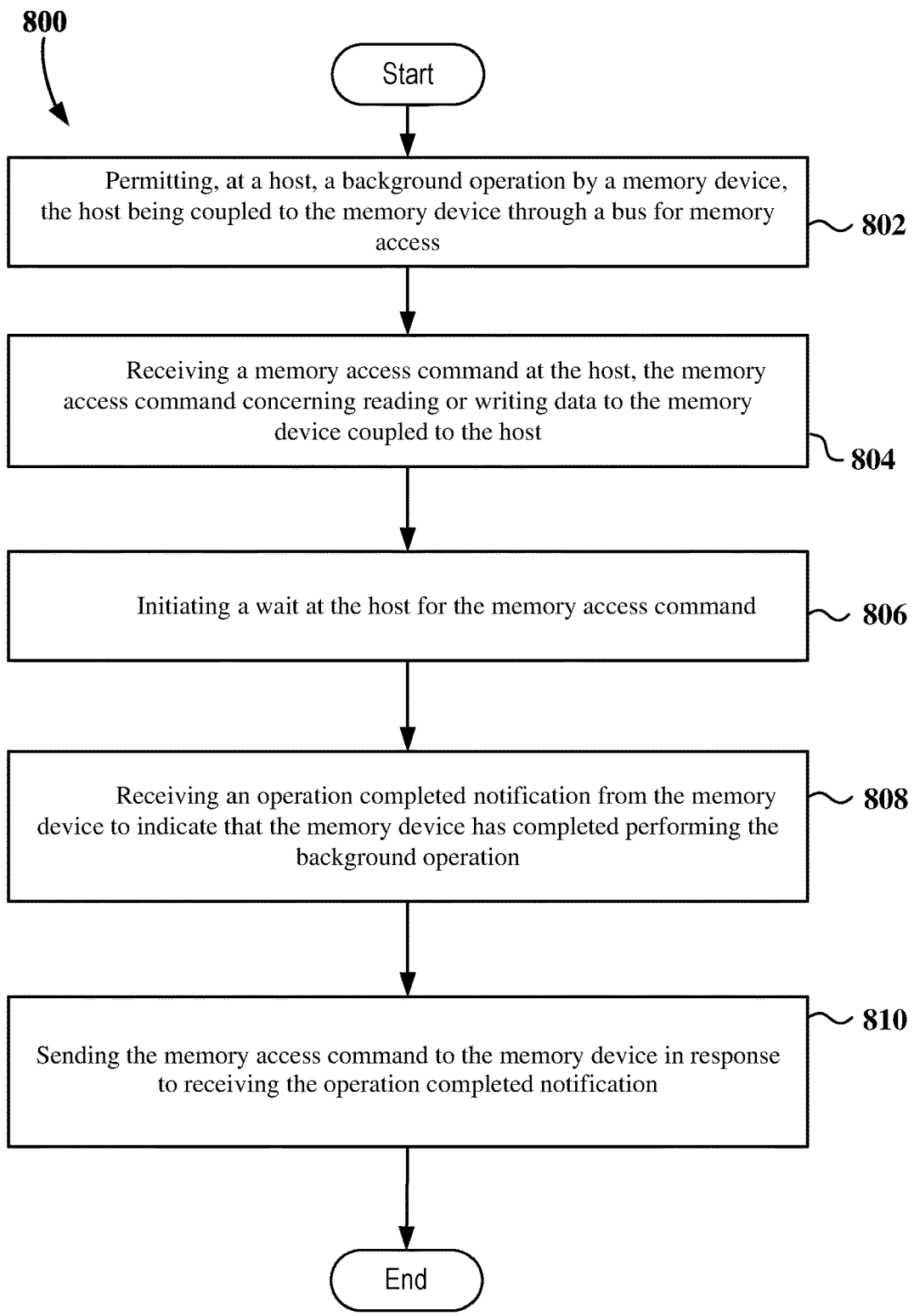
FIG. 8 is a flow diagram of aspects of interrupting memory access during background operations according to aspects of the present disclosure.

FIG. 8 is a process flow diagram illustrating an example of a method for interrupting memory access during background operations on a memory device. The method may be performed in the host controller processor 704 of FIG. 7 or other circuitry, and software as described in the context of FIG. 7. The method 800 begins at block 802 with permitting, at a host, a background operation by a memory device, e.g., a memory management operation, the host being coupled to the memory device through a bus for memory access. In some examples, the background operation is a purge operation to remove data from physical blocks of memory cells. In some aspects, the host first receives a purge operation needed request from the memory device, and sets a purge enable flag in response to receiving the purge operation needed request. In some aspects, the host determines a status of a command queue before permitting the background operation, e.g., setting a purge enable flag.

The method 800 continues in block 804 with receiving a memory access command at the host. The memory access command concerns reading or writing data to the memory device coupled to the host. In block 806, initiating a wait at the host for the memory access command is performed. In some aspects the wait includes buffering the memory access command in a wait queue in response to the purge enable flag.

Receiving an operation completed notification from the memory device to indicate that the memory device has completed performing the background operation is performed at block 808. In some aspects, the operation completed notification comprises an interrupt, e.g., a bit of a Universal Flash Storage wExceptionEventStatus attribute.

Responsive to the receiving the operation completed notification, sending the memory access command to the memory device is performed in block 810. In some aspects, the memory access command includes writing data from the wait queue to the memory device.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Combinations of the above should also be included within the scope of computer-readable media.

The following provides an overview of examples of the present disclosure.

Example 1: A host for a memory device comprising: background operation circuitry configured to permit a background operation by a memory device, the host being coupled to the memory device through a bus for memory access, and to receive an operation completed notification from the memory device to indicate that the memory device has completed performing the background operation; memory access command circuitry configured to receive a memory access command, the memory access command concerning reading or writing data to the memory device coupled to the host, to initiate a wait at the host for the memory access command, and to send the memory access command to the memory device in response to receiving the operation completed notification.

Example 2: The host of example 1, further comprising a wait queue and wherein the initiating the wait comprises buffering the memory access command in the wait queue and wherein the sending the memory access command comprises writing the data from the wait queue to the memory device.

Example 3: The host of example 1 or 2, wherein the background operation is a purge operation to remove data from physical blocks of memory cells.

Example 4: The host of example 3, further comprising: setting a purge enable flag before the receiving the memory access command; and clearing the purge enable flag in response to receiving the operation completed notification.

Example 5: The host of any one or more of examples 1 to 4, further comprising a wait queue and wherein the initiating the wait comprises buffering the memory access command in the wait queue and wherein the sending the memory access command comprises writing the data from the wait queue to the memory device.

Example 6: The host of any one or more of examples 1 to 5, further comprising a command queue and queue management circuitry, wherein the queue management circuitry is configured to determine a status of the command queue and wherein the background operation circuitry is configured to permit a background operation in response to the command queue status.

Example 7: A method comprising: permitting, at a host, a background operation by a memory device, the host being coupled to the memory device through a bus for memory access; receiving a memory access command at the host, the memory access command concerning reading or writing data to the memory device coupled to the host; initiating a wait at the host for the memory access command; receiving an operation completed notification from the memory device to indicate that the memory device has completed performing the background operation; and sending the memory access command to the memory device in response to receiving the operation completed notification.

Example 8: The method of example 7, further comprising determining that the memory device is performing the background operation before the initiating the wait.

Example 9: The method of example 8, wherein the receiving the memory access command comprises receiving the memory access command from an application layer, the method further comprising sending a delay notice to the application layer in response to the determining that the memory device is performing the background operation.

Example 10: The method of any one or more of examples 7 to 9, wherein initiating the wait comprises buffering the memory access command in a wait queue of the host and wherein sending the memory access command comprises writing the data from the wait queue to the memory device.

Example 11: The method of any one or more of examples 7 to 10, wherein the background operation is a purge operation to remove data from physical blocks of memory cells.

Example 12: The method of example 11, further comprising: setting a purge enable flag before the receiving the memory access command; and clearing the purge enable flag in response to receiving the operation completed notification.

Example 13: The method of example 12, wherein the background operation is a purge operation, the method further comprising: receiving a purge operation needed request from the memory device; setting a purge enable flag in response to receiving the purge operation needed request, and wherein buffering the memory access command is performed in response to the purge enable flag.

Example 14: The method of example 13, further comprising determining a status of a command queue before setting the purge enable flag.

Example 15: The method of any one or more of examples 7 to 14, further comprising buffering further received memory access commands in a wait queue before receiving the operation completed notification.

Example 16: The method of any one or more of examples 7 to 15, wherein the receiving the memory access command comprises receiving the memory access command from an application layer, the method further comprising sending a delay notice to the application layer in response to the initiating the wait.

Example 17: The method of example 16, further comprising receiving the memory access command from the application layer a second time after a delay.

Example 18: The method of any one or more of examples 7 to 17, wherein the operation completed notification comprises an interrupt.

Example 19: The method of any one or more of examples 7 to 18, wherein the operation completed notification comprises a bit of a Universal Flash Storage wExceptionEventStatus attribute.

Example 20: The method of any one or more of examples 7 to 19, further comprising: receiving a background operation needed request from the memory device to perform the background operation; and setting a background operation enable flag in response to the request, wherein the determining that the memory device is performing the background operation is in response to setting the background operation enable flag.

Example 21: The method of any one or more of examples 7 to 20, wherein the background operation is a memory management operation.

Example 22: A method comprising: performing a background operation on memory cells of a memory device; sending an operation completed notification to a host coupled to the memory device in response to completing the background operation; receiving a write command from the host in response to the operation completed notification; and writing data of the write command to the memory cells of the memory device.

Example 23: The method of example 22, further comprising: receiving a background operation enable flag from the host before performing the background operation; and receiving a clearing of the background operation enable flag after sending the operation completed notification.

Example 24: The method of example 22 or 23, wherein the performing the background operation comprises performing a purge operation to remove data from physical blocks of memory cells.

Example 25: The method of any one or more of examples 22 to 24, wherein the background operation is a purge operation, the method further comprising: sending a purge operation needed request to the host; and receiving a purge enable flag in response to sending the purge operation needed request and before the performing the background operation.

Example 26: The method of any one or more of examples 22 to 25, wherein the operation completed notification comprises an interrupt.

Example 27: The method of any one or more of examples 22 to 26, wherein the operation completed notification comprises a bit of a Universal Flash Storage wExceptionEventStatus attribute.

What is claimed is:

1. A host for a memory device comprising:
a bus interface coupled to a bus, the bus configured to carry commands as packets to and from a memory controller of the memory device;
background operation circuitry configured to set a background operation enable flag, to enable a background operation by the memory device on a physical block of memory cells of the memory device by sending a command to the memory controller through the bus, wherein the host is coupled to the memory device through a bus for memory access, wherein the memory controller operates the background operation independently of the host, to receive an operation completed notification from the memory device to indicate that the memory device has completed performing the background operation on the physical block of memory cells, to clear the background operation enable flag in response to the receiving the operation completion notification, and to send a command to the memory controller to clear the enabling of the background operation in response to the receiving the operation completed notification; and
memory access command circuitry configured to receive a memory access command from a higher layer of a computing system after setting the background operation enable flag, wherein the memory access command concerns reading or writing data to the memory device coupled to the host, to initiate a wait at the host for the memory access command in response to the receiving after setting the background operation enable flag, and to send the memory access command through the bus to the memory device in response to the receiving the operation completed notification.

2. The host of claim 1, further comprising a wait queue and wherein the initiating the wait comprises buffering the memory access command in the wait queue and wherein the sending the memory access command comprises writing the data from the wait queue to the memory device.

3. The host of claim 1, wherein the background operation is a purge operation to remove data from an entire physical blocks of memory cells and wherein the enable flag comprises a purge enable flag.

4. The host of claim 1, further comprising a command queue and queue management circuitry, wherein the queue management circuitry is configured to determine a status of the command queue and wherein the background operation circuitry is configured to enable a background operation in response to the command queue status.

5. The host of claim 1, wherein the background operation circuitry is further to receive a background operation needed request from the memory device to perform the background operation, and wherein the setting the background operation enable flag is in response to the background operation needed request.

6. The host of claim 1, wherein the memory access command circuitry is to send a delay notice to the higher layer in response to initiating the wait.

7. A method comprising:
setting a background operation enable flag;
enabling, at a host, a background operation by a memory device on a physical block of memory cells of the memory device by sending a command to a memory controller of the memory device through a bus, wherein the host is coupled to the memory device through a bus for memory access, wherein the memory controller operates the background operation independently of the host;
receiving a memory access command at the host from a higher layer of a computing system after setting the background operation enable flag, wherein the memory access command concerns reading or writing data to the memory device coupled to the host;
initiating a wait at the host for the memory access command in response to the receiving after the setting the background operation enable flag;
receiving an operation completed notification through the bus from the memory device to indicate that the memory device has completed performing the background operation on the physical block of memory cells;

clearing the background operation enable flag in response to the receiving the operation completion notification;

sending a command to the memory device to clear the enabling of the background operation in response to the receiving the operation completion notification; and sending the memory access command through the bus to the memory device in response to the receiving the operation completed notification.

8. The method of claim 7, further comprising determining that the memory device is performing the background operation before the initiating the wait.

9. The method of claim 7, further comprising sending a delay notice to the higher layer in response to the initiating the wait.

10. The method of claim 9, further comprising receiving the memory access command from the higher layer as a retry a second time after a delay.

11. The method of claim 9, further aborting the memory access command in response to the delay notice.

12. The method of claim 7, wherein initiating the wait comprises buffering the memory access command in a wait queue of the host and wherein sending the memory access command comprises writing the data from the wait queue to the memory device.

13. The method of claim 7, further comprising determining a status of a command queue and wherein the setting the background operation enable flag is in response to the command queue status.

14. The method of claim 7, further comprising buffering further received memory access commands in a wait queue before receiving the operation completed notification.

15. The method of claim 7, wherein the operation completed notification comprises an interrupt.

16. The method of claim 7, wherein the operation completed notification comprises a bit of a Universal Flash Storage wExceptionEventStatus attribute.

17. The method of claim 7, further comprising:
receiving a background operation needed request from the memory device to perform the background operation;
wherein the setting the background operation enable flag is in response to the background operation needed request.

18. The method of claim 17, wherein the background operation needed request includes an indication of a level of operations outstanding.

19. The method of claim 18,
wherein the background operation needed request is in a form of a response protocol information unit,
wherein the enabling a background operation comprises sending a request protocol information unit, and wherein the sending the command to clear the enabling of the background operation enable flag comprises sending a request protocol information unit.

20. The method of claim 7, wherein the background operation is a memory management operation.

21. The method of claim 20, wherein the background operation is a purge operation to remove data from physical blocks of memory cells,
wherein the setting the background operation enable flag comprises setting a purge enable flag, and
wherein the clearing the enabling of the background operation comprises clearing the purge enable flag.

22. A method comprising:
detecting a background operation enable flag set by a host;
receiving a background operation enable command from the host in a packet through a bus;
performing a background operation on memory cells of a memory device independently of the host in response to receiving the background operation enable command;
sending an operation completed notification in a packet through the bus from the memory device to the host in response to completing the background operation;
receiving a command in a packet from the host to clear the enabling of the background operation in response to the operation completed notification;
receiving a memory access command command in a packet through the bus from the host in response to the clearing the background operation enable flag; and
performing the memory access of the memory access command to the memory cells of the memory device in response to the memory access command.

23. The method of claim 22, wherein the operation completed notification comprises an interrupt.

24. The method of claim 22, wherein the operation completed notification comprises a bit of a Universal Flash Storage wExceptionEventStatus attribute.

25. The method of claim 22, further comprising:
sending a background operation needed request to the host to perform the background operation,
wherein the detecting the background operation enable flag is in response to the background operation needed request.

26. The method of claim 25, wherein the background operation needed request includes an indication of a level of operations outstanding.

27. The method of claim 22, wherein the background operation enable command is in a form of a request protocol information unit, and the operation completed notification is in a form of a response protocol information unit that includes a flag.

* * * * *